(12) United States Patent
Strong et al.

(10) Patent No.: US 12,188,609 B2
(45) Date of Patent: Jan. 7, 2025

(54) ADAPTER ASSEMBLY FOR A PEDESTAL MOUNT FOR AN ELECTRONIC DEVICE

(71) Applicant: Parabit Systems, Inc., Roosevelt, NY (US)

(72) Inventors: Donald W. Strong, Rochester, NY (US); Robert J. Leiponis, Glen Cove, NY (US)

(73) Assignee: Parabit Systems, Inc, Roosevelt, NY (US)

(*) Notice: Subject to any disclaimer, the term of this patent is extended or adjusted under 35 U.S.C. 154(b) by 0 days.

(21) Appl. No.: 18/359,291

(22) Filed: Jul. 26, 2023

(65) Prior Publication Data

US 2024/0035614 A1 Feb. 1, 2024

Related U.S. Application Data

(60) Provisional application No. 63/392,650, filed on Jul. 27, 2022.

(51) Int. Cl.
*F16M 13/02* (2006.01)
*F16M 11/22* (2006.01)
*G06F 1/16* (2006.01)

(52) U.S. Cl.
CPC ............ *F16M 13/02* (2013.01); *F16M 11/22* (2013.01); *F16M 2200/08* (2013.01); *G06F 1/1632* (2013.01)

(58) Field of Classification Search
CPC .... F16M 2200/08; F16M 13/02; F16M 11/22; A47F 7/024; E05B 73/0082; G06F 1/1632

USPC .................................. 248/205.1, 551, 158
See application file for complete search history.

(56) References Cited

U.S. PATENT DOCUMENTS

| | | | |
|---|---|---|---|
| 8,153,872 B1* | 4/2012 | Ward ................ | G10D 3/14 84/304 |
| 8,537,012 B2* | 9/2013 | Rapp ............... | B65H 75/42 340/568.2 |
| 9,936,823 B2* | 4/2018 | Galant ............. | G08B 13/1409 |
| 10,750,885 B2* | 8/2020 | Hyma .............. | F16B 33/002 |
| 2011/0068919 A1* | 3/2011 | Rapp ............... | A47F 7/024 340/568.2 |
| 2011/0309934 A1* | 12/2011 | Henson ............ | G08B 13/1472 340/568.8 |
| 2012/0160973 A1* | 6/2012 | Du .................. | F16M 11/041 248/440.1 |

(Continued)

*Primary Examiner* — Christopher Garft
(74) *Attorney, Agent, or Firm* — Michael J Porco; Gerald E Hespos

(57) ABSTRACT

An adapter assembly for a pedestal mount for an electronic device is provided. An assembly for mounting a pedestal mount for an electronic device includes a weldment including a mount plate having a first surface and a second surface, a mount pipe is coupled to the mount plate and extends perpendicularly from the second surface of the mount plate, the first surface of the mount plate configured to receive a base of the pedestal mount, the mount pipe including a non-threaded portion coupled to the mount plate and a threaded portion; an adapter block configured to mate in a recess of a structure, the adapter block including a first aperture configured to receive the mount pipe; and a fastener configured to be disposed over the threaded portion of the mount pipe to secure a portion of the structure between the mount plate and adaptor block.

10 Claims, 7 Drawing Sheets

(56) References Cited

U.S. PATENT DOCUMENTS

| | | | |
|---|---|---|---|
| 2012/0188082 A1* | 7/2012 | Berglund | G08B 13/1445 |
| | | | 340/568.2 |
| 2014/0226298 A1* | 8/2014 | Palmer | E05B 73/0082 |
| | | | 361/807 |
| 2015/0305518 A1* | 10/2015 | Galant | A47F 7/0246 |
| | | | 29/525.08 |
| 2017/0245663 A1* | 8/2017 | Berglund | G08B 13/14 |
| 2018/0049563 A1* | 2/2018 | Henson | G08B 13/1454 |
| 2018/0279805 A1* | 10/2018 | Galant | F16M 11/041 |
| 2018/0324974 A1* | 11/2018 | Mills | A47B 23/00 |
| 2019/0063666 A1* | 2/2019 | Hoang | F16M 13/02 |
| 2020/0271266 A1* | 8/2020 | Gulick, Jr. | A47F 7/024 |
| 2020/0347858 A1* | 11/2020 | Huang | B25J 15/0625 |
| 2021/0084879 A1* | 3/2021 | Sarnowski | A01K 97/10 |

\* cited by examiner

SECTION A-A

SECTION C - C

ADAPTER ASSEMBLY FOR A PEDESTAL MOUNT FOR AN ELECTRONIC DEVICE

PRIORITY

This application claims priority to U.S. Provisional Patent Application Ser. No. 63/392,650, filed Jul. 27, 2022, the contents of which are hereby incorporated by reference in its entirety.

BACKGROUND

Field

The present disclosure relates generally to accessories for electronic devices, and more particularly, an adapter assembly for a pedestal mount for an electronic device.

Description of the Related Art

Pedestal mounts are known in the art. Generally, pedestal mounts are employed to provide a hands-free viewing of an electronic device, such as terminal, tablet, mobile phone, etc. For example, an electronic device may be mounted to a pedestal mount to provide information or instructions to people walking by a location where the pedestal mount is located. Additionally, the electronic device may be interactive to receive input from a user and provide a display to the user, for example, as a point-of-sale terminal. Depending on the use case, the pedestal mount may need to be mounted on a variety of structures, for example, a pedestrian gate, a retail counter, entry/exit points, etc.

Thus, a need exists for techniques for mounting a pedestal mount to a structure.

SUMMARY

The present disclosure relates to an adapter assembly for a pedestal mount for an electronic device.

An assembly for mounting a pedestal mount for an electronic device includes a weldment including a mount plate having a first surface and a second surface, a mount pipe is coupled to the mount plate and extends perpendicularly from the second surface of the mount plate, the first surface of the mount plate configured to receive a base of the pedestal mount, the mount pipe including a non-threaded portion coupled to the mount plate and a threaded portion; an adapter block configured to mate in a recess of a structure, the adapter block including a first aperture configured to receive the mount pipe; and a fastener configured to be disposed over the threaded portion of the mount pipe to secure a portion of the structure between the mount plate and adaptor block.

In one aspect, the adaptor block includes a second aperture and the pipe mount includes a third aperture, the second aperture and third aperture align to receive a set screw therethrough to prevent rotation of the mount plate relative to the adaptor block.

In another aspect, the adapter block further includes at least two extension members, each extension member including an aperture for receiving a fastener to secure the adaptor block to the structure.

In a further aspect, the assembly includes a gasket disposed on the second surface of the mount plate.

In one aspect, the gasket is configured in sustainability the same shape as the mount plate.

In another aspect, the first surface of the mount plate includes at least one aperture configured for receiving a fastener to secure the pedestal mount to the first surface.

In a further aspect, the adapter block is generally rectangular including four side walls, two opposing side walls including setback portions configured to mate with the recess of the structure.

In yet another aspect, the pedestal mount is configured to support the electronic device in a perpendicular arrangement relative to the first surface of the mount plate.

In one aspect, the electronic device is at least one of a terminal, tablet, mobile phone and/or a display device.

In another aspect, the structure is at least one of a speed gate and counter.

In a further aspect, the fastener is at least one of a hex nut and pipe fitting.

BRIEF DESCRIPTION OF THE DRAWINGS

The above and other aspects, features, and advantages of the present disclosure will become more apparent in light of the following detailed description when taken in conjunction with the accompanying drawings in which.

It should be understood that the drawings are for purposes of illustrating the concepts of the disclosure and are not necessarily the only possible configuration for illustrating the disclosure.

DETAILED DESCRIPTION

Preferred embodiments of the present disclosure will be described hereinbelow with reference to the accompanying drawings. In the following description, well-known functions or constructions are not described in detail to avoid obscuring the present disclosure in unnecessary detail. Herein, the phrase "coupled" is defined to mean directly connected to or indirectly connected with through one or more intermediate components. Such intermediate components may include both hardware and software-based components.

Figure 1A:
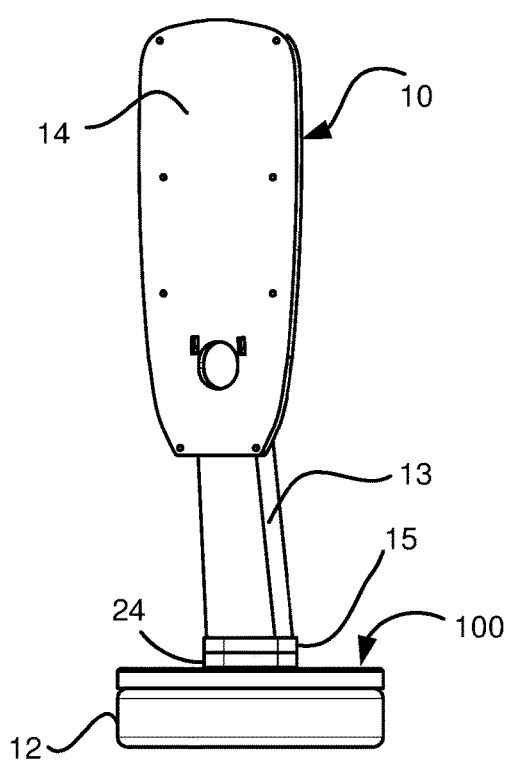
FIG. 1A is a front view of a pedestal mount for an electronic device mounted to a structure in accordance with an embodiment of the present disclosure.
Figure 1C:
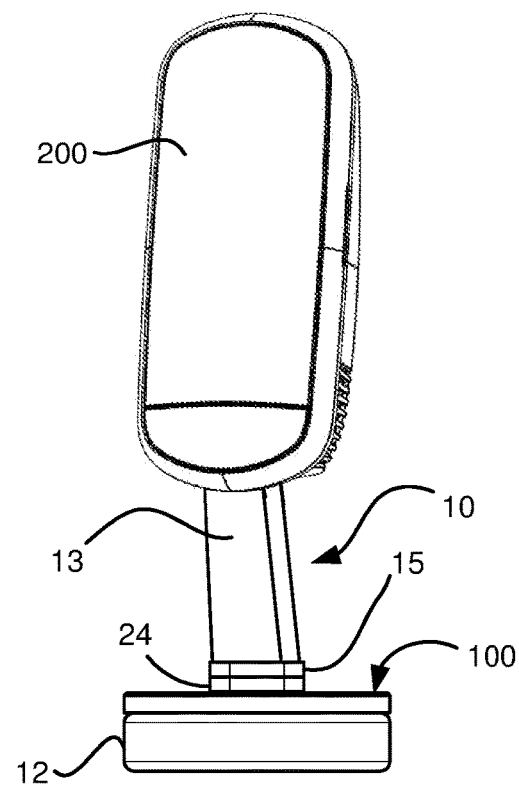
FIG. 1C is a front view of a pedestal mount with an electronic device mounted thereon in accordance with an embodiment of the present disclosure
Figure 1B:
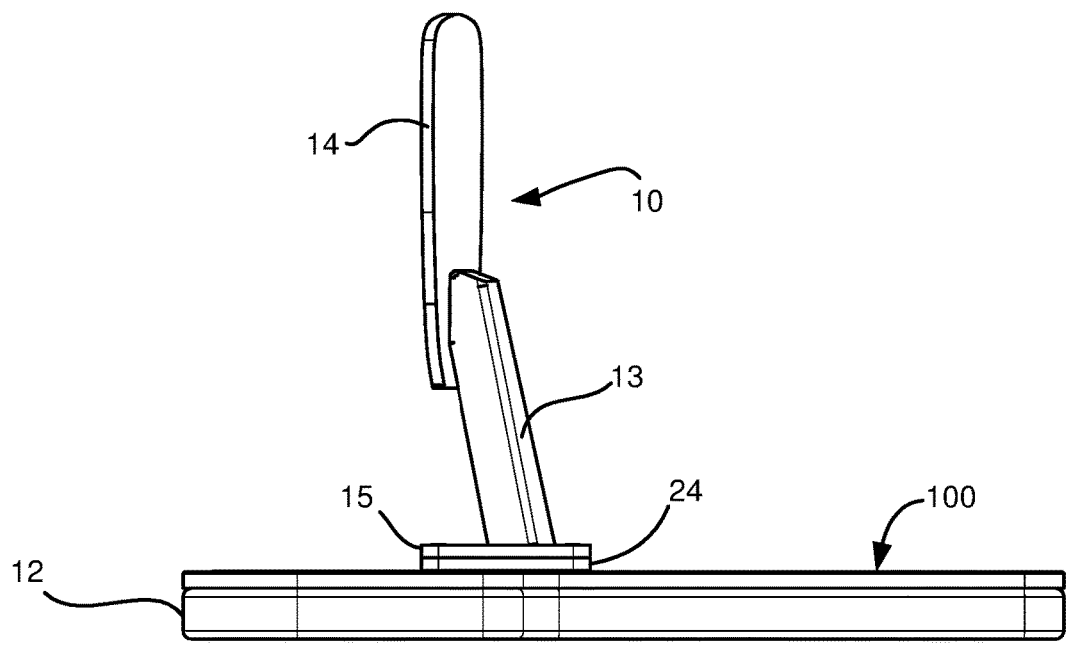
FIG. 1B is a side view of a pedestal mount for an electronic device mounted to a structure in accordance with an embodiment of the present disclosure.

The present disclosure relates to an adapter assembly for a pedestal mount for an electronic device. Referring to FIGS. 1A and 1B, a pedestal mount 10 for an electronic device is mounted to a structure 12. FIG. 1C illustrates an electronic device 200 mounted to the pedestal mount 10. In an exemplary embodiment, the pedestal mount 10 is mounted to a structure 12 such as a pedestrian speed gate and supports an electronic device that, for example, provides instructions to a pedestrian passing through the speed gate. The pedestal mount 10 includes a base 15, a support arm 13 and a support member 14. The electronic device 200 may be mounted to a support member 14 of the pedestal mount 10.

The electronic device 200 may provide access control through the pedestrian gate by accepting user credentials and controlling, for example, a door of the gate. The electronic device 200 may include, but is not limited to, a terminal, a tablet, a mobile phone, a point-of-sale (POS) terminal, a display device, etc. Furthermore, the structure 12 may include, but is not limited to, a pedestrian gate, a retail counter, entry/exit points, etc. In one embodiment, a speed or pedestrian gate may include two spaced apart walls configured to enable a person to walk between the two walls. Each wall may include a gate to control the flow of pedestrian therethrough. One of the side walls may include a surface for supporting the pedestal mount.

Figure 2:
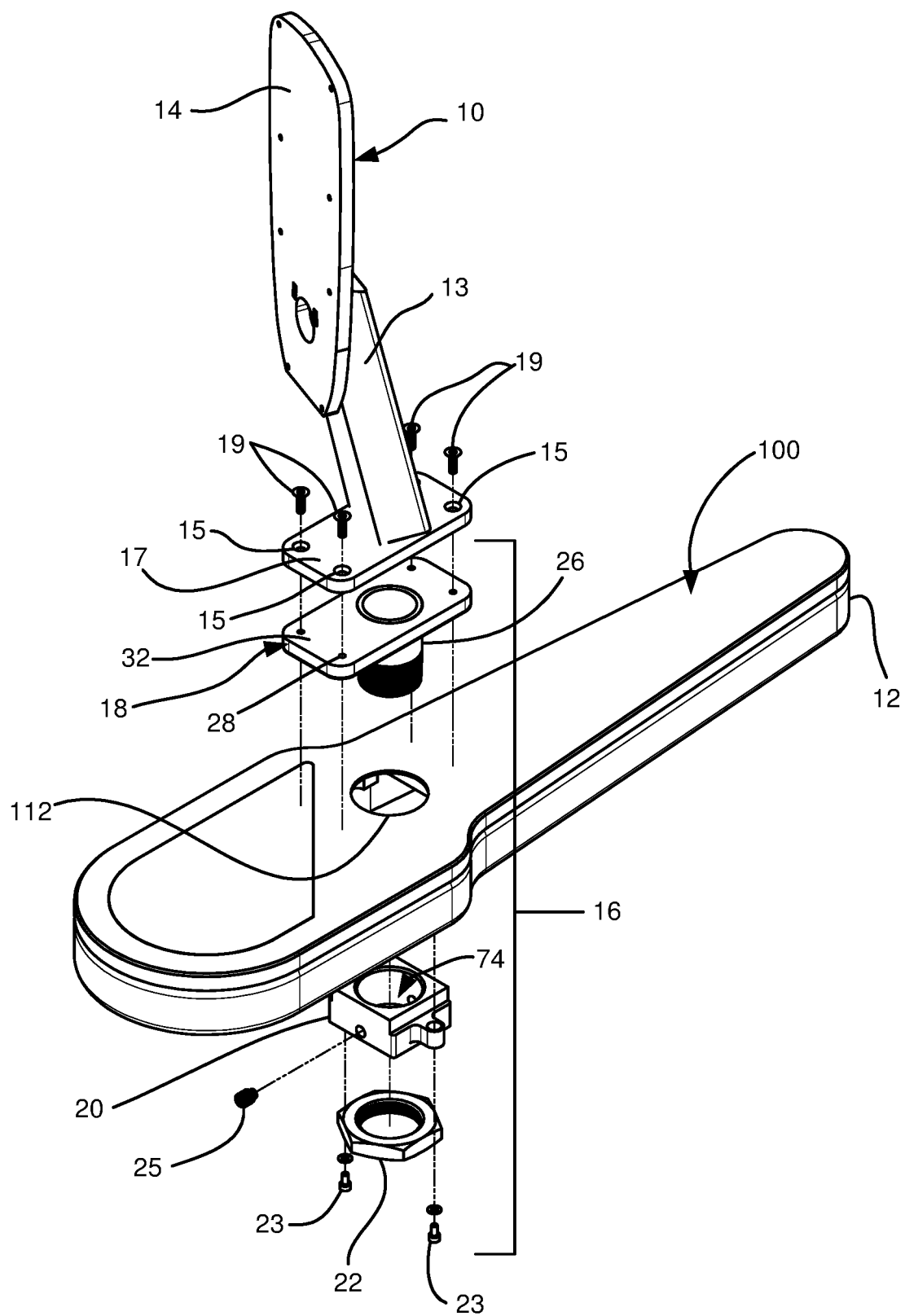
FIG. 2 is a perspective, exploded view of an adapter assembly for a pedestal mount for an electronic device mounted to a structure in accordance with an embodiment of the present disclosure.
Figure 3:
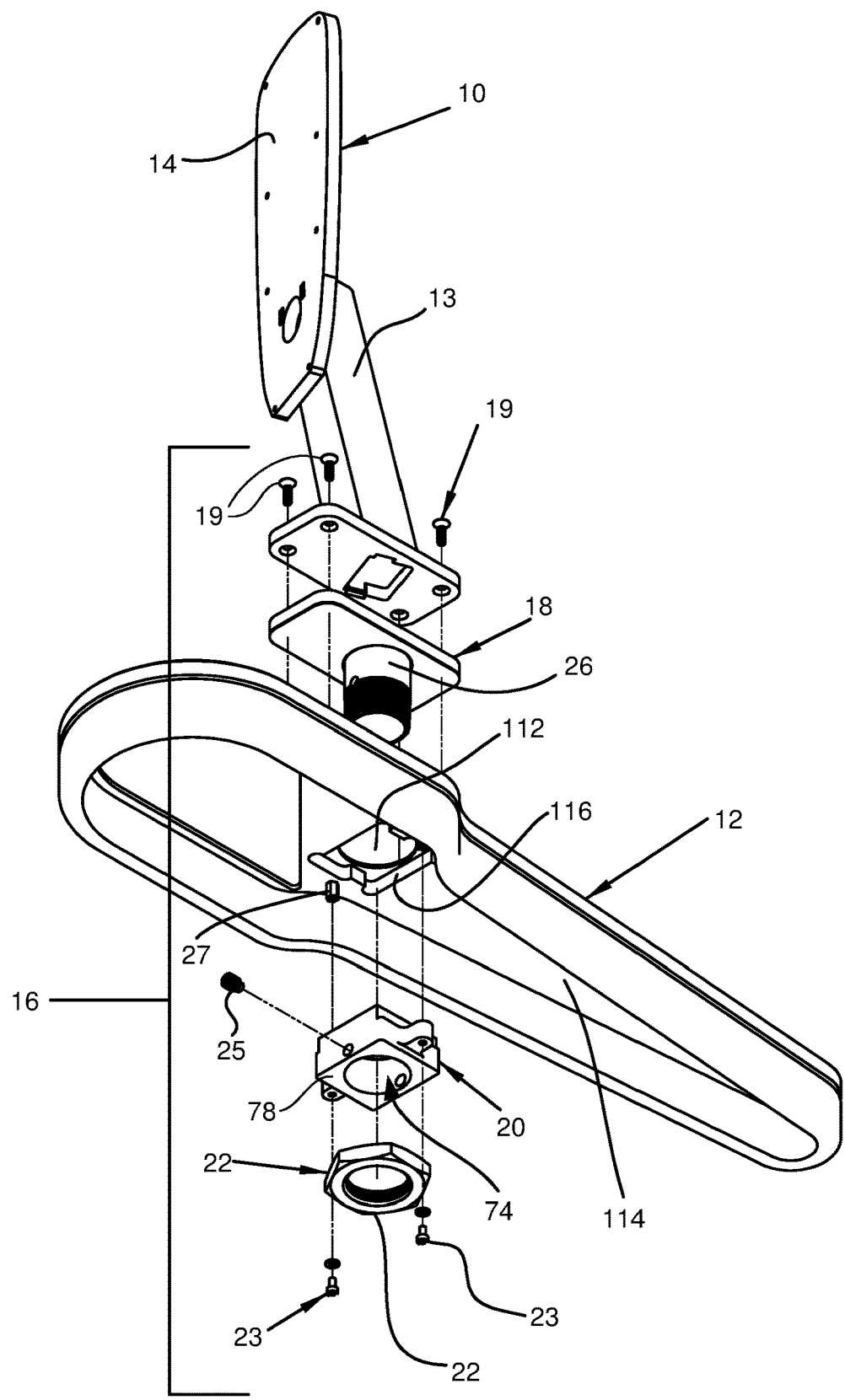
FIG. 3 is another perspective, exploded view of an adapter assembly for a pedestal mount for an electronic device mounted to a structure in accordance with an embodiment of the present disclosure.

Referring to FIGS. 2 and 3, perspective, exploded views of an adapter assembly 16 for a pedestal mount 10 for an electronic device mounted to a structure 12 in accordance with an embodiment of the present disclosure is illustrated. The adapter assembly 16 includes a mount plate weldment 18, an adapter block 20 and a fastener 22, such as a pipe fitting or hex nut.

Figure 5A:
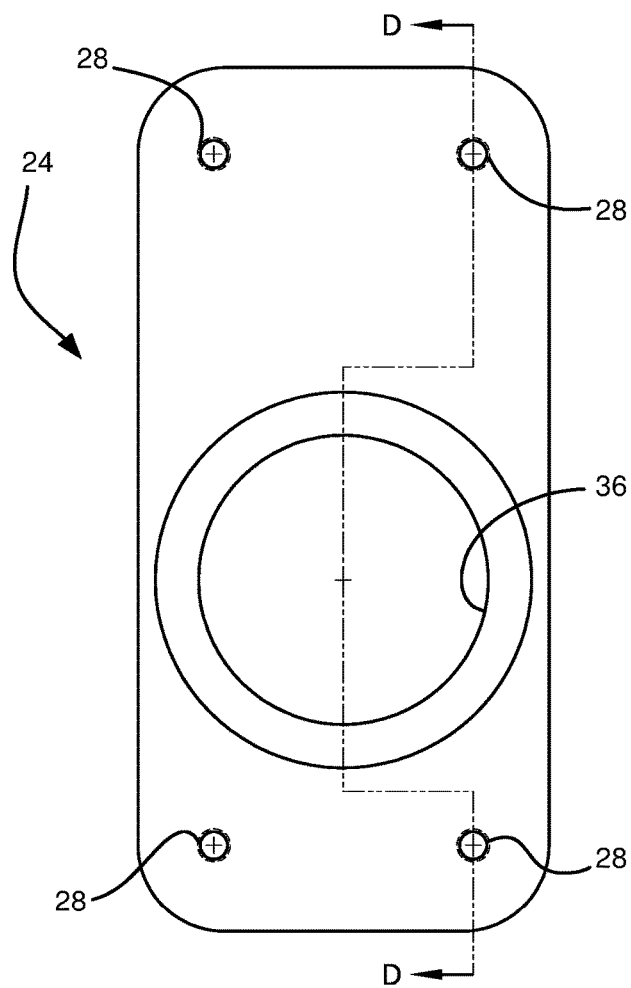
FIG. 5A is a top view of a mount plate in accordance with an embodiment of the present disclosure.
Figure 5B:
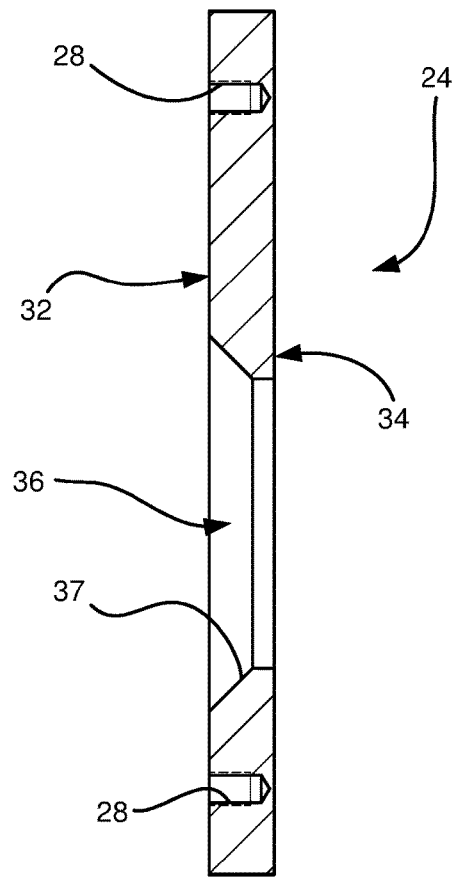
FIG. 5B is a cross section view of the mount plate weldment shown in FIG. 5A taken along lines D-D in accordance with an embodiment of the present disclosure.
Figure 6A:
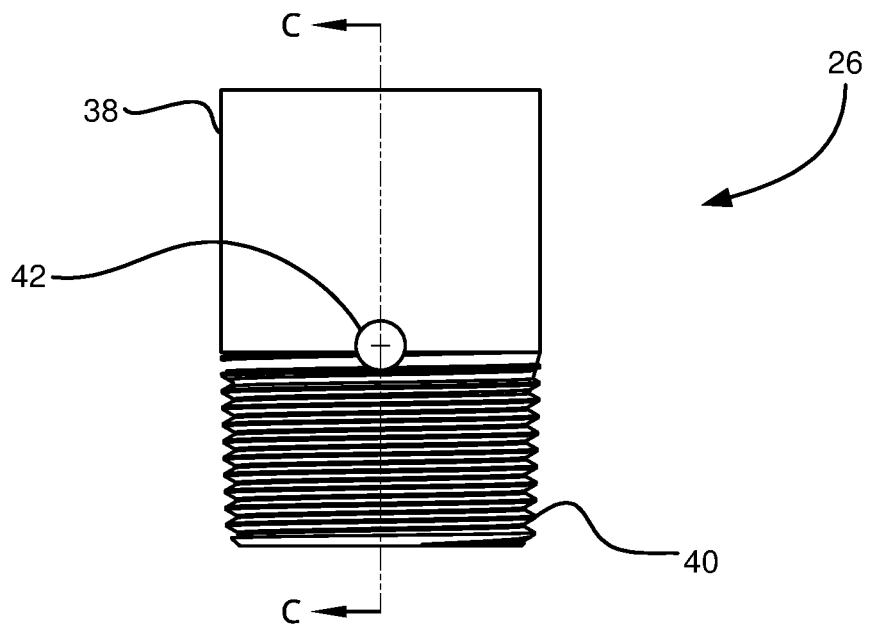
FIG. 6A is a side view of a mount pipe in accordance with an embodiment of the present disclosure.
Figure 6B:
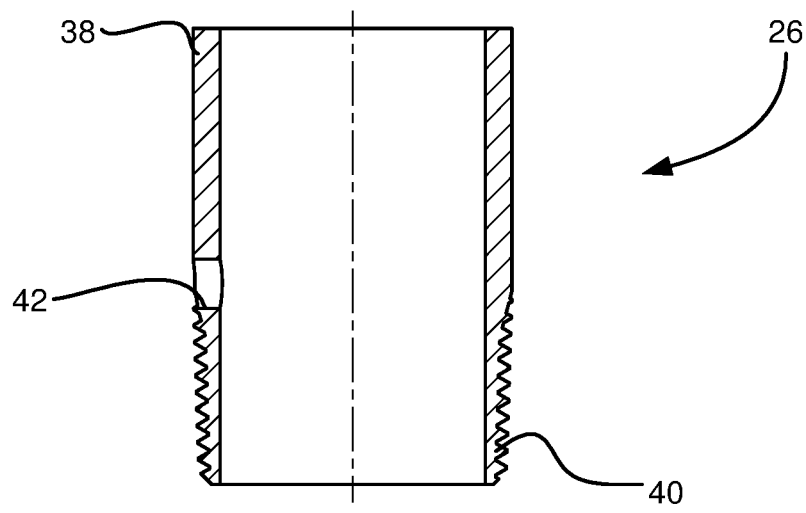
FIG. 6B is a cross section view of the mount pipe shown in FIG. 6A taken along lines C-C in accordance with an embodiment of the present disclosure.
Figure 7A:
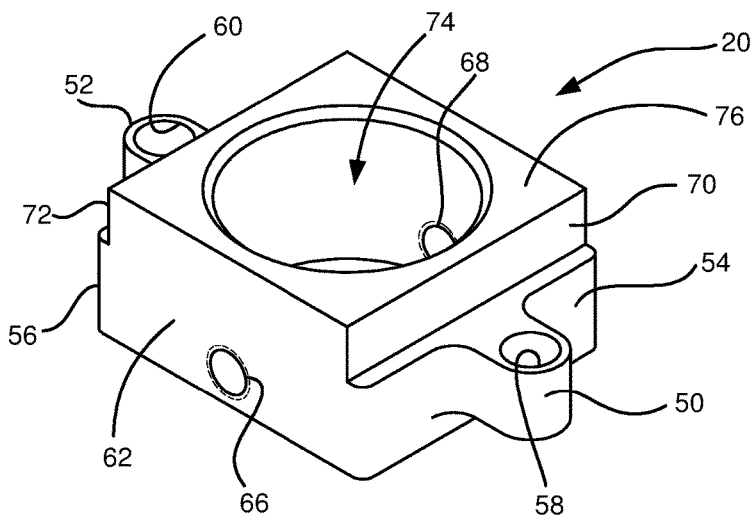
FIG. 7A is a perspective view of an adapter block in accordance with an embodiment of the present disclosure.
Figure 7B:
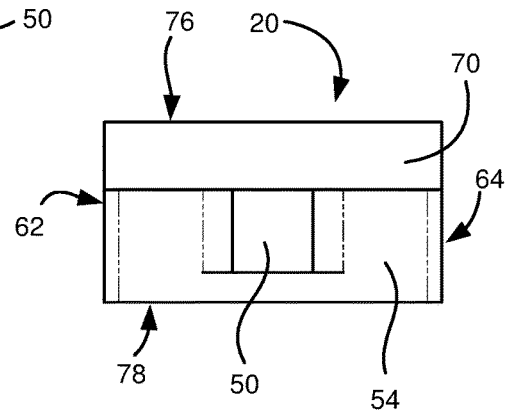
FIG. 7B is a side view of an adapter block in accordance with an embodiment of the present disclosure.
Figure 7C:
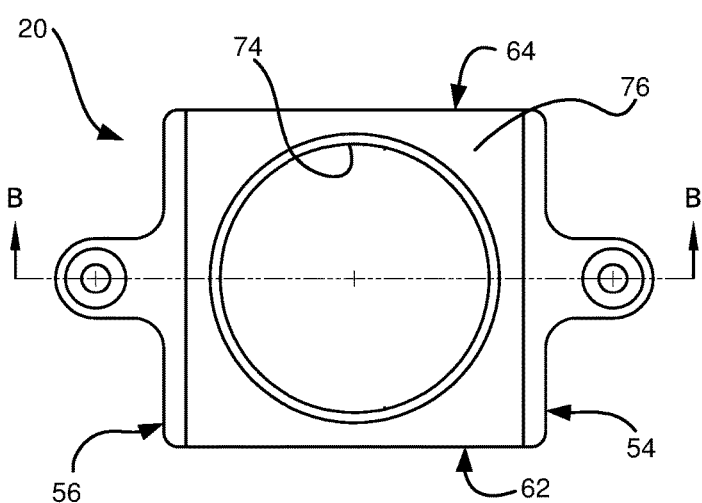
FIG. 7C is a top view of an adapter block in accordance with an embodiment of the present disclosure.
Figure 7D:
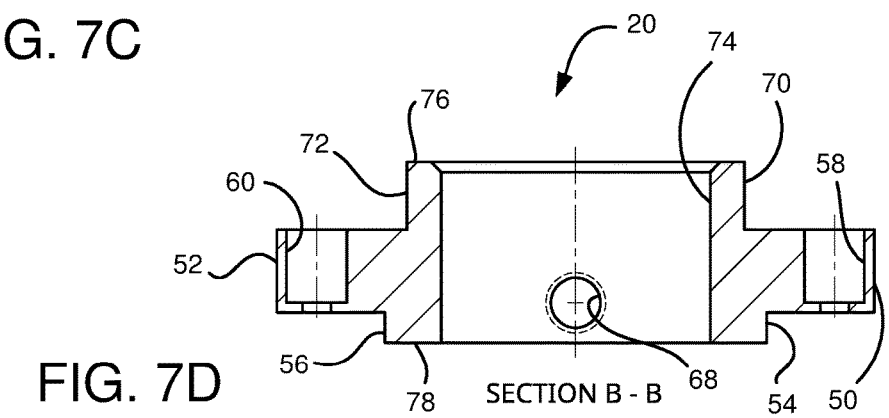
FIG. 7D is a cross section view of the adapter block shown in FIG. 7C taken along lines B-B in accordance with an embodiment of the present disclosure.

Referring to FIGS. 4A-4D, various views of the mount plate weldment 18 are illustrated. The weldment 18 incudes a generally rectangular mount plate 24 having a top, first surface 32 and a lower, second surface 34. The weldment 18 further includes a mount pipe 26 that extends perpendicular from the second surface 34 of the mount plate 24. Mount plate 24 includes at least four threaded apertures 28 configured to receive screws 19 for coupling the pedestal mount 10 to the plate 24, as will be described in detail below. As shown in FIG. 5B, it is to be appreciated that the apertures 28 do not pass through from the top surface 32 of the plate 24 to the bottom surface 34 of the plate 24. Plate 24 further includes aperture 36 to receive a non-threaded end 38 of the mount pipe 26. It is to be appreciated that the aperture 36 may include a slanted portion 37, as shown in FIG. 5B, to facilitate welding the mount pipe 26 to the plate 24. As shown in FIGS. 6A and 6B, the mount pipe 26 include the non-threaded portion 38 and a threaded portion 40. An aperture 42 is disposed on the mount pipe 24 approximately where the non-threaded portion 38 meets the threaded portion 40. It is to be appreciated that the aperture 42 may be threaded or non-threaded.

Referring to FIGS. 7A-7D, various views of the adapter block 20 are illustrated. The adapter block 20 is generally square and includes first and second extension members 50, 52 which extend from opposing side walls 54, 56. Each of the extension members 50, 52 include apertures 58, 60 which are employed to secure the adaptor block 20 to a portion of the structure 12, as will be described below. The adapter block 20 further includes side walls 62, 64, where each of side walls 62, 64 include an aperture 66, 68 respectively. In one embodiment, apertures 66, 68 are threaded to receive a set screw. It is further to be appreciated that side walls 54, 56 include setback portions 70, 72 respectively. An aperture 74 extends through the adaptor block 20 from top surface 76 to bottom surface 78.

Referring back to FIGS. 2 and 3, the assembling of the adaptor assembly 16 will now be described. In one embodiment, the structure 12 that the pedestal mount 10 may be mounted to is a pedestrian speed gate. As shown in FIG. 2, an upper portion 12 of the speed gate is shown. The upper portion 12 may be positioned on a side wall of the speed gate and arranged parallel to a floor and at a viewable height. The upper portion 12 of the speed gate includes a flat upper surface 100 that includes aperture 112. FIG. 3 illustrates a lower perspective view of the upper portion 12 of the speed gate showing a lower surface 114. The portion 12 includes a generally square recess 116 disposed about the aperture 112 formed in the lower surface 114. The adapter block 20 is disposed in the recess 116 such that the recesses 70, 72 of the adapter block 20 mate with the recess 116 and aperture 74 of adapter block 20 aligns with aperture 112 of the upper portion 12. The adaptor block 20 may then be secured to the lower surface via a fastener 23, for example, screws. In one embodiment, the lower surface 114 includes at least one receiving member 27 configured to receive fastener 23.

The mount pipe 26 of the weldment 18 is then disposed in the aperture 112 from the top surface 100 such that the threaded portion 40 of the mount pipe 26 extends past the lower surface 78 of the adapter block 20. A set screw 25 is disposed in the aperture 66 or aperture 68 of the adaptor block 20 and further extends into aperture 42 of the mount pipe 26 to prevent the weldment 18 from rotating. The weldment 18 is then secured to the upper portion 12 of the speed gate by disposing a fastener such as a hex nut 22 about the threaded portion 40 of the mount pipe 26. Once the weldment 18 is secured to the upper portion 12 of the speed gate, a base 17 of the pedestal mount 10 is disposed over the mount plate 24 of the weldment 18 such that a plurality of apertures 15 on the base 17 of the pedestal mount 10 align with the apertures 28 on the top surface of the mount plate 24. The pedestal mount 10 is then secured to the weldment 18 via fasteners 19, for example, screws, disposed in apertures 15 and 28. In one embodiment, the pedestal mount 10 is configured to support the electronic device 200 in a perpendicular arrangement relative to the first surface of the mount plate, and thus perpendicular to a floor of the pedestrian gate enabling viewing of the electronic device 200 as a pedestrian passes through the gate or structure 12.

Figure 4A:
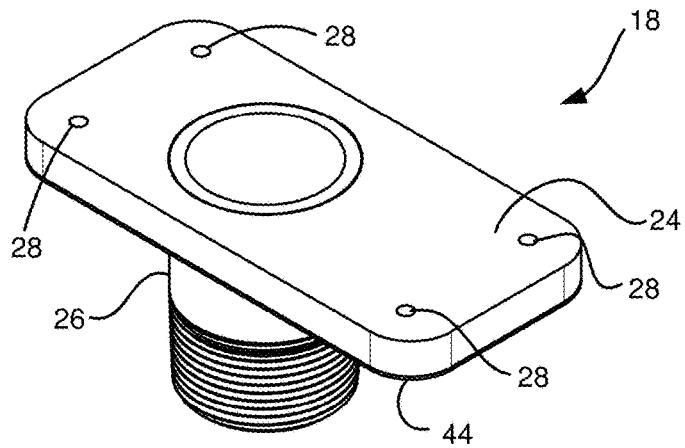
FIG. 4A is a perspective view of a mount plate weldment in accordance with an embodiment of the present disclosure.
Figure 4B:
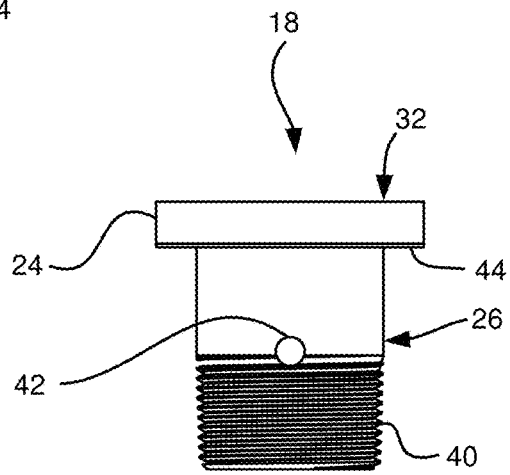
FIG. 4B is a side view of a mount plate weldment in accordance with an embodiment of the present disclosure.
Figure 4C:
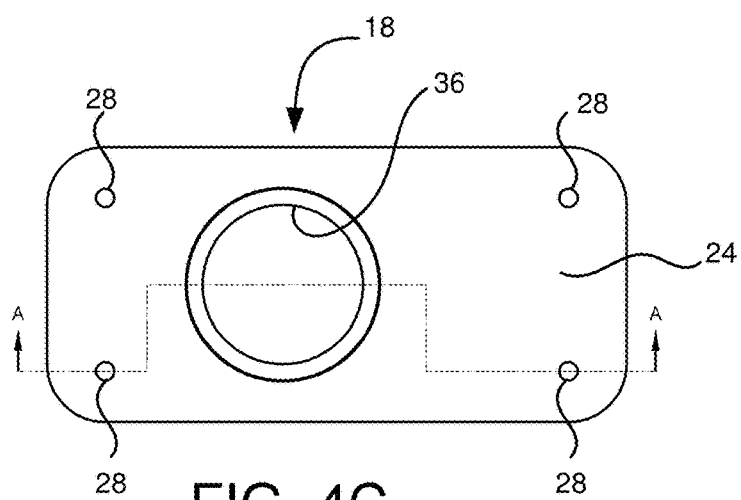
FIG. 4C is a top view of a mount plate weldment in accordance with an embodiment of the present disclosure.
Figure 4D:
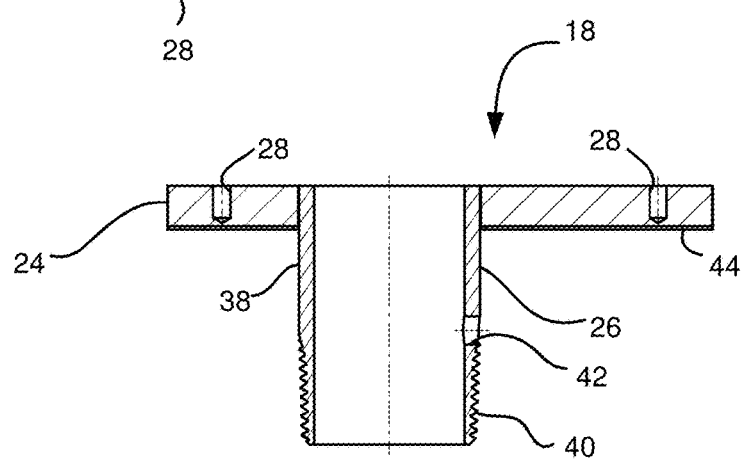
FIG. 4D is a cross section view of the mount plate weldment shown in FIG. 4C taken along lines A-A in accordance with an embodiment of the present disclosure.

In one embodiment, a gasket 44, as a neoprene gasket, may be disposed between the lower surface 34 of the mount plate 24 and the upper surface 100 of the upper portion 12 of the speed gate to protect surface 100 and prevent scratches, as shown in FIGS. 4A, 4B and 4D. It is to be appreciated that gasket 44 may be configured in substantially the same shape as the mount plate 24 (i.e., rectangular) to avoid being seen when the assembly is mount to the upper portion of the speed gate 12. Other shapes, sizes and thicknesses of the gasket 44 are contemplated to be within the scope of the present disclosure.

It is to be appreciated that the various features shown and described are interchangeable, that is a feature shown in one embodiment may be incorporated into another embodiment.

While the disclosure has been shown and described with reference to certain preferred embodiments thereof, it will be understood by those skilled in the art that various changes in form and detail may be made therein without departing from the spirit and scope of the disclosure as defined by the appended claims.

Furthermore, although the foregoing text sets forth a detailed description of numerous embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

What is claimed is:

1. An assembly for mounting a pedestal mount for an electronic device comprising:
   a weldment including a mount plate having a first surface and a second surface, a mount pipe is coupled to the second surface of the mount plate and extends perpendicularly from the mount plate, the first surface of the mount plate configured to receive a base of the pedestal mount, the mount pipe including a non-threaded portion coupled to the mount plate and a threaded portion;
   an adapter block configured to mate in a recess of a structure, the adapter block including a first aperture configured to receive the mount pipe; and
   a fastener configured to be disposed over the threaded portion of the mount pipe to secure a portion of the structure between the mount plate and adaptor block,
   wherein the adaptor block includes a second aperture and the mount pipe includes a third aperture, the second aperture and third aperture align to receive a set screw therethrough to prevent rotation of the mount plate relative to the adaptor block.

2. The assembly of claim 1, wherein the adapter block further includes at least two extension members, each extension member including an aperture for receiving a fastener to secure the adaptor member to the structure.

3. The assembly of claim 1, further comprising a gasket disposed on the second surface of the mount plate.

4. The assembly of claim 3, wherein the gasket is configured in sustainability the same shape as the mount plate.

5. The assembly of claim 1, wherein the first surface of the mount plate includes at least one aperture configured for receiving a fastener to secure the pedestal mount to the first surface.

6. The assembly of claim 2, wherein the adapter block is generally rectangular including four side walls, two opposing side walls including setback portions configured to mate with the recess of the structure.

7. The assembly of claim 1, wherein the pedestal mount is configured to support the electronic device in a perpendicular arrangement relative to the first surface of the mount plate.

8. The assembly of claim 7, wherein the electronic device is at least one of a terminal, tablet, mobile phone and/or a display device.

9. The assembly of claim 8, wherein the structure is at least one of a speed gate and counter.

10. The assembly of claim 1, wherein the fastener is a hex nut.

\* \* \* \* \*